(12) United States Patent
Ueda

(10) Patent No.: US 8,882,857 B2
(45) Date of Patent: Nov. 11, 2014

(54) SOLID ELECTROLYTIC CAPACITOR AND METHOD FOR MANUFACTURING THE SAME

(75) Inventor: Masahiro Ueda, Osaka (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 189 days.

(21) Appl. No.: 13/324,026

(22) Filed: Dec. 13, 2011

(65) Prior Publication Data

US 2012/0147530 A1    Jun. 14, 2012

(30) Foreign Application Priority Data

Dec. 14, 2010  (JP) .................................. 2010-277994

(51) Int. Cl.
| | |
|---|---|
| H01G 9/00 | (2006.01) |
| H01G 9/028 | (2006.01) |
| H01G 9/15 | (2006.01) |
| H01G 9/042 | (2006.01) |

(52) U.S. Cl.
 CPC ................ H01G 9/028 (2013.01); H01G 9/15 (2013.01); H01G 9/0425 (2013.01); H01G 9/0036 (2013.01)
 USPC ........................................ 29/25.03

(58) Field of Classification Search
 None
 See application file for complete search history.

(56) References Cited

U.S. PATENT DOCUMENTS 4,571,664 A * 2/1986 Hyland ......................... 361/540
4,780,796 A   10/1988 Fukuda et al.

FOREIGN PATENT DOCUMENTS

| JP | 3-231415 A | 10/1991 |
|---|---|---|
| JP | 4-074853 B2 | 11/1992 |
| JP | 10-50561 A | 2/1998 |
| JP | 2003-249420 A | 9/2003 |

OTHER PUBLICATIONS

Japanese Office Action dated Jun. 24, 2014, issued in Japanese Patent Application No. 2010-277994, w/English translation (5 pages).

* cited by examiner

*Primary Examiner* — Scott B Geyer
(74) *Attorney, Agent, or Firm* — Westerman, Hattori, Daniels & Adrian, LLP

(57) ABSTRACT

A capacitor element of a solid electrolytic capacitor includes an anode body serving as an anode, a dielectric coating, a solid electrolyte layer, an insulating layer, and a carbon layer and a silver paste layer serving as a cathode. The insulating layer is formed to cover a relatively thin portion of the solid electrolyte layer.

4 Claims, 4 Drawing Sheets

SOLID ELECTROLYTIC CAPACITOR AND METHOD FOR MANUFACTURING THE SAME

This nonprovisional application is based on Japanese Patent Application No. 2010-277994 filed on Dec. 14, 2010 with the Japan Patent Office, the entire contents of which are hereby incorporated by reference.

BACKGROUND OF THE INVENTION

1. Field of the Invention

The present invention relates to a solid electrolytic capacitor and a method for manufacturing the same, and particularly to a solid electrolytic capacitor including an anode body formed of a sintered compact, and a method for manufacturing such solid electrolytic capacitor.

2. Description of the Related Art

A solid electrolytic capacitor has been conventionally known as a capacitor suitable for size reduction. This solid electrolytic capacitor is manufactured as follows. First, valve metal powder such as, for example, tantalum (Ta) is molded into a molded body having a predetermined shape and the molded body is sintered, thereby forming an anode body. Next, a surface of the anode body is subjected to electrolytic oxidation treatment, thereby forming a dielectric coating. Next, using chemical polymerization or electrolytic polymerization, a conductive polymer layer is formed to cover the dielectric coating. This conductive polymer layer is referred to as a solid electrolyte layer, and is formed to reduce the equivalent series resistance.

Next, a carbon layer is applied to cover the solid electrolyte layer and a silver paste layer is further applied to cover the carbon layer, thereby forming a cathode layer. A capacitor element including the anode body, the dielectric coating, the solid electrolyte, and the cathode layer is thus formed. Next, the capacitor element is put on a predetermined lead frame and sealed with an exterior resin. As a result, a solid electrolytic capacitor is completed. It is to be noted that Japanese Patent Publication No. 04-74853 is one example of the literatures disclosing the solid electrolytic capacitor.

As described above, in the solid electrolytic capacitor, the solid electrolyte layer covering the dielectric coating is formed using chemical polymerization or electrolytic polymerization. In addition, the anode body having the dielectric coating formed thereon is molded into a predetermined shape such as, for example, a substantially rectangular parallelepiped. It has been found, however, that this method for forming the solid electrolyte layer (polymerization) and the shape of the anode body may make it difficult in some cases to form the solid electrolyte layer having an uniform thickness on a surface of the dielectric coating. Therefore, the inventor of the present invention has confirmed that an electrical short circuit may occur between the anode body and the cathode layer (the carbon layer and the silver paste layer) particularly at a relatively thin portion of the solid electrolyte layer.

SUMMARY OF THE INVENTION

The present invention has been made to solve the above problems and an object thereof is to provide a solid electrolytic capacitor that allows suppression of an electrical short circuit between an anode body and a cathode layer, and another object is to provide a method for manufacturing such solid electrolytic capacitor.

A solid electrolytic capacitor according to the present invention includes: an anode body having a predetermined shape; a dielectric coating; a solid electrolyte layer; an insulating layer; and a cathode layer. The dielectric coating is formed to cover the anode body. The solid electrolyte layer is formed to cover the dielectric coating. The insulating layer is formed to cover a relatively thin portion of the solid electrolyte layer in the solid electrolyte layer. The cathode layer is formed to cover the insulating layer and the solid electrolyte layer.

A method for manufacturing a solid electrolytic capacitor according to the present invention includes the following steps. An anode body having a predetermined shape is formed. A dielectric coating is formed on a surface of the anode body. A solid electrolyte layer is formed to cover the dielectric coating using at least one of chemical polymerization and electrolytic polymerization. An insulating layer is formed to cover a relatively thin portion of the solid electrolyte layer. A cathode layer is formed to cover the dielectric coating and the insulating layer.

In the solid electrolytic capacitor according to the present invention, the insulating layer is formed to cover the relatively thin portion of the solid electrolyte layer in the solid electrolyte layer. Therefore, an electrical short circuit between the anode body and the cathode layer can be suppressed. As a result, the reliability of the solid electrolytic capacitor can be increased.

In the method for manufacturing the solid electrolytic capacitor according to the present invention, the insulating layer is formed to cover the relatively thin portion of the solid electrolyte layer, which was formed due to formation of the solid electrolyte layer. Therefore, an electrical short circuit between the anode body and the cathode layer can be suppressed. As a result, the reliability of the solid electrolytic capacitor can be increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
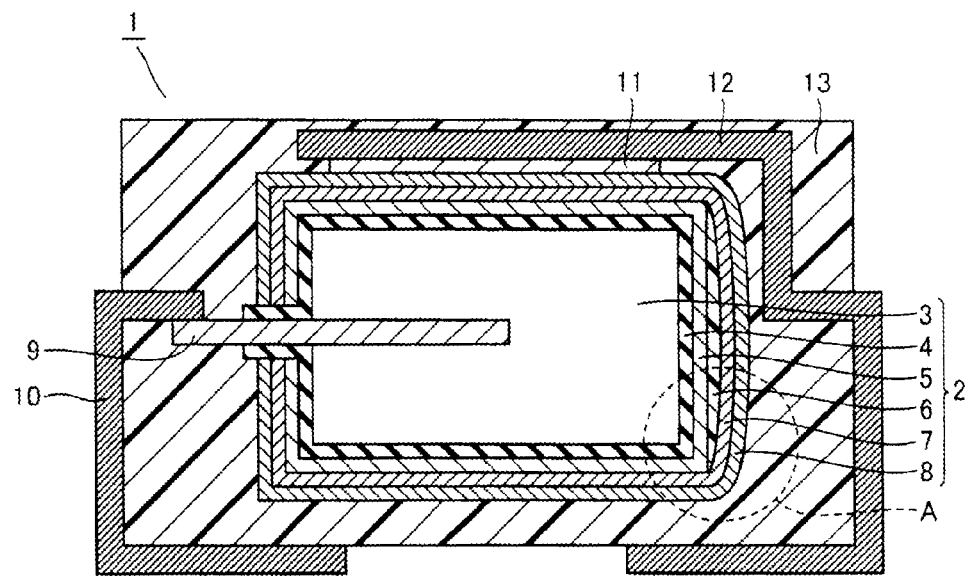
FIG. 1 is a cross-sectional view of a solid electrolytic capacitor according to a first embodiment of the present invention.

A description will be given to a solid electrolytic capacitor according to a first embodiment of the present invention. As shown in FIG. 1, a capacitor element 2 serving as a capacitor main body in a solid electrolytic capacitor 1 includes an anode body 3 serving as an anode, a dielectric coating 4, a solid electrolyte layer 5, an insulating layer 6, and a carbon layer 7 and a silver paste layer 8 serving as a cathode.

Anode body 3 of capacitor element 2 has an anode lead 9 provided in an upright manner and one end of an anode terminal 10 is electrically connected to anode lead 9. One end side of a cathode terminal 12 is electrically connected to silver paste layer 8 of capacitor element 2 with a conductive bonding layer 11 interposed therebetween. An exterior resin 13 seals capacitor element 2 in such a manner that the other end side of anode terminal 10 and the other end side of cathode terminal 12 are exposed.

Next, a structure of capacitor element 2 will be described in detail. Anode body 3 is foamed of a sintered compact of a valve-acting metal. Tantalum (Ta), niobium (Nb), titanium (Ti), aluminum (Al) and the like can, for example, be applied as the valve-acting metal. In addition, anode body 3 may be porous. A material of anode lead 9 provided in an upright manner at anode body 3 is not particularly limited as long as anode lead 9 is made of a metal. More preferably, however, anode lead 9 is made of the valve-acting metal.

Dielectric coating 4 is formed to cover anode body 3. Solid electrolyte layer 5 is formed to cover dielectric coating 4. Solid electrolyte layer 5 is preferably formed of a conductive polymer including at least one of an aliphatic compound, an aromatic compound, a heterocyclic compound, and a heteroatom-containing compound, and is formed of, for example, polythiophene and derivatives thereof, polypyrrole and derivatives thereof, polyaniline and derivatives thereof, and polyfuran and derivatives thereof. Since this solid electrolyte layer 5 is formed, higher electrical conductivity is obtained and the equivalent series resistance (ESR) of the solid electrolytic capacitor can be reduced.

Figure 2:
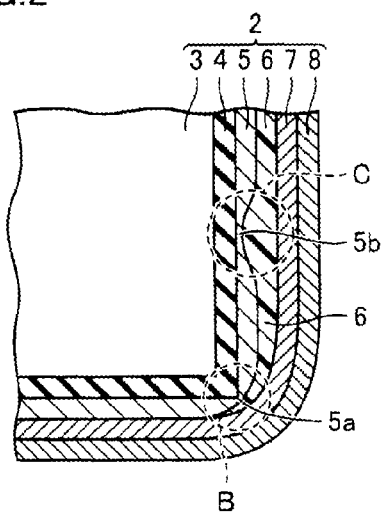
FIG. 2 is a partially enlarged cross-sectional view of the solid electrolytic capacitor shown in FIG. 1 in the first embodiment.

Insulating layer 6 is formed to cover a relatively thin portion of solid electrolyte layer 5. The relatively thin portion of solid electrolyte layer 5 includes a portion 5a (within a dotted frame B) corresponding to a corner of anode body 3 as well as a portion 5b (within a dotted frame C) in which a burr produced in forming solid electrolyte layer 5 was removed, as shown in FIG. 2. FIG. 2 is an enlarged view of a portion within a dotted frame A shown in FIG. 1. A material of insulating layer 6 is not particularly limited as long as insulating layer 6 is made of a resin having an electrical insulation property. Insulating layer 6 is preferably made of, for example, an epoxy resin, an acrylic resin, a phenolic resin, a melamine resin, a fluorine resin and the like.

Carbon layer 7 is formed to cover solid electrolyte layer 5 and insulating layer 6. Carbon layer 7 may only have conductivity and graphite can be applied, for example. Silver paste layer 8 is formed to cover carbon layer 7.

In the above-mentioned solid electrolytic capacitor, insulating layer 6 is formed to cover relatively thin portions 5a and 5b of solid electrolyte layer 5 covering anode body 3 on which dielectric coating 4 is formed, and a cathode layer (carbon layer 7+silver paste layer 8) is formed to cover insulating layer 6 and dielectric coating 4. Therefore, an electrical short circuit between anode body 3 and the cathode layer can be prevented at relatively thin portions 5a and 5b of solid electrolyte layer 5. As a result, the reliability of the solid electrolytic capacitor can be increased.

Second Embodiment

Figure 3:
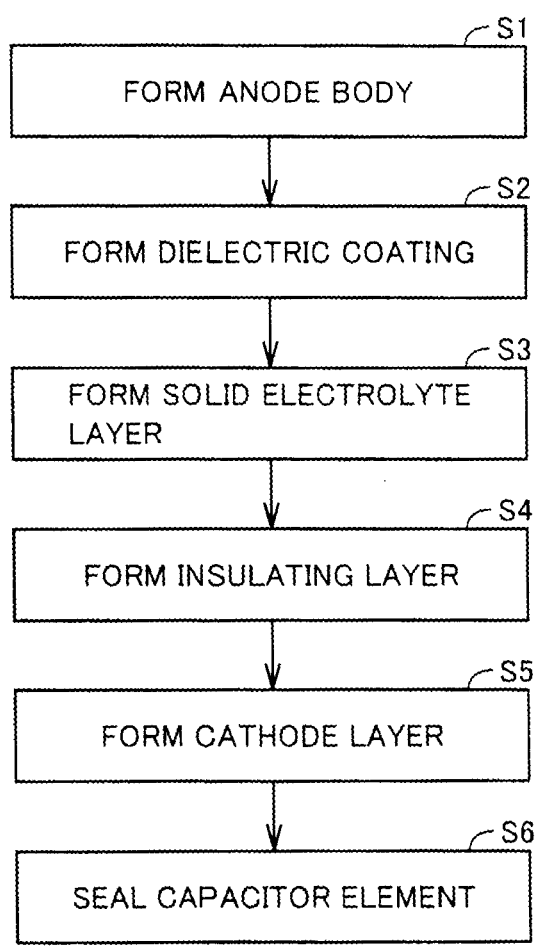
FIG. 3 shows a flow of a method for manufacturing the solid electrolytic capacitor according to a second embodiment of the present invention.

A description will be given to one example of a method for manufacturing the above-mentioned solid electrolytic capacitor as a second embodiment of the present invention. FIG. 3 shows one example of a manufacturing flow. As shown in FIGS. 3 and 1, an anode body is first formed in step S1. Metal powder having the valve action is prepared, and this metal powder is molded into a desired shape, with one end side of anode lead 9 in the longitudinal direction buried into the metal powder. Next, the molded body is sintered to form anode body 3. This anode body 3 may be porous.

Next, a dielectric coating is formed in step S2. Anode body 3 is subjected to chemical conversion treatment, and thereby dielectric coating 4 is formed to cover anode body 3. As the chemical conversion treatment, there is a method for soaking anode body 3 in a chemical conversion solution such as a phosphoric acid aqueous solution or nitric acid aqueous solution, and applying a predetermined voltage, for example.

Next, a solid electrolyte layer is fouled in step S3. First, a monomer that will form a conductive polymer layer is adhered to dielectric coating 4 and the monomer is subjected to oxidation polymerization to form the conductive polymer layer. Known chemical polymerization or electrolytic polymerization can be used when this conductive polymer layer is formed.

As a method using chemical polymerization, there is a method for adhering the monomer onto a surface of dielectric coating 4 and chemically polymerizing the monomer, for example. As a method for adhering the monomer onto the surface of dielectric coating 4, there is a method for soaking dielectric coating 4 in a polymerization liquid containing the monomer. As another method using chemical polymerization, there is a method for soaking dielectric coating 4 in a polymerization liquid containing three components of the monomer, a dopant and an oxidant, for example.

As a method using electrolytic polymerization, there is a method for adhering the monomer to dielectric coating 4 and electrolytically polymerizing the monomer to form the conductive polymer layer, for example. As a method for adhering the monomer to dielectric coating 4, there is a method for soaking dielectric coating 4 in an electrolytic solution containing the monomer and the dopant. By passing a predetermined current through this electrolytic solution, the conductive polymer layer can be formed.

The conductive polymer layer is thus formed as solid electrolyte layer 5 to cover dielectric coating 4.

Figure 4:
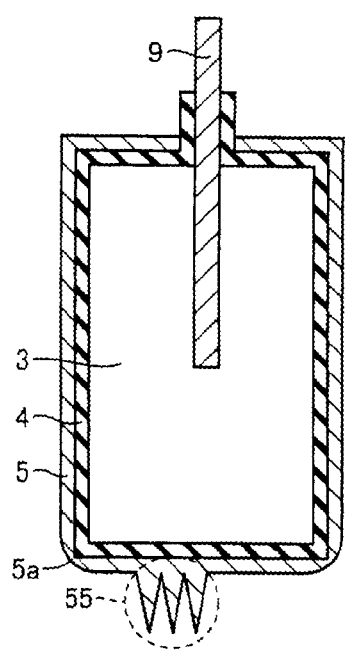
FIG. 4 is a cross-sectional view showing one step of the method for manufacturing the solid electrolytic capacitor in the second embodiment.

As described above, the conductive polymer layer serving as solid electrolyte layer 5 is formed using chemical polymerization or electrolytic polymerization. As a result of this polymerization, however, a burr 55 may be produced at solid electrolyte layer 5 in some cases as shown in FIG. 4. In chemical polymerization, the burr is caused by dripping of the polymerization liquid when the anode body is pulled out of the polymerization liquid. In electrolytic polymerization, the burr is caused by a part of the conductive polymer growing from the anode body toward the electrode during electrolytic polymerization. Due to pulling out of the polymerization liquid or the arrangement relationship between the anode body and the electrode as described above, burr 55 tends to be produced on the opposing end side opposite to an end of anode body 3 where anode lead 9 is provided in an upright manner.

Figure 5:
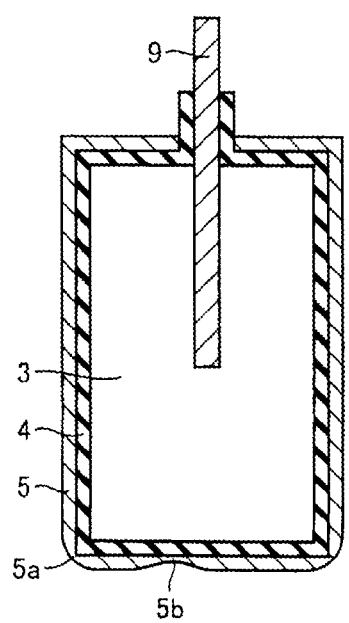
FIG. 5 is a cross-sectional view showing a step performed after the step shown in FIG. 4 in the second embodiment.

If the solid electrolytic capacitor is formed under the presence of burr 55, burr 55 could come into contact with cathode terminal 12 (refer to FIG. 1). In addition, burr 55 could be exposed from the exterior resin. Thus, next, burr 55 produced at solid electrolyte layer 5 is removed as shown in FIG. 5. At this time, portion 5b of solid electrolyte layer 5 may become relatively thinner after removal of burr 55. In addition to this portion 5b in which burr 55 was removed, solid electrolyte layer 5 may also become relatively thinner at portion 5a corresponding to the corner of anode body 3.

Figure 6:
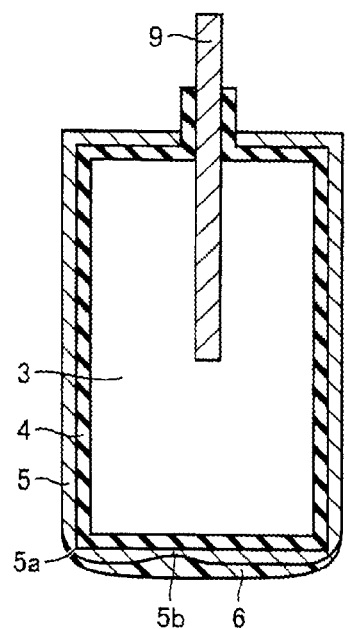
FIG. 6 is a cross-sectional view showing a step performed after the step shown in FIG. 5 in the second embodiment.

Thus, next, insulating layer 6 made of, for example, an epoxy resin and the like is coated in step S4 to cover relatively thin portions 5a and 5b of solid electrolyte layer 5 as shown in FIG. 6. As a method for coating, there are a dip method, a spray method and the like, for example. A material of insulating layer 6 is not limited to the epoxy resin as long as insulating layer 6 is made of a material having an electrical insulation property. Insulating layer 6 may be made of, for example, an acrylic resin, a phenolic resin, a melamine resin, a fluorine resin and the like.

Next, a cathode layer is formed in step S5. Carbon layer 7 (refer to FIG. 1) is formed to cover solid electrolyte layer 5 and insulating layer 6. Next, silver paste layer 8 (refer to FIG. 1) is fanned to cover carbon layer 7. Capacitor element 2 is thus formed.

Next, a capacitor element is sealed in step S6. First, the capacitor element is fixed to a predetermined lead frame including portions serving as an anode terminal and a cathode terminal. At this time, the portion serving as the anode terminal is electrically connected to an anode lead, and the portion serving as the cathode terminal is electrically connected to silver paste layer 8 with bonding layer 11 (refer to FIG. 1) interposed therebetween. Next, the lead frame having the capacitor element mounted thereto is put into a predetermined mold, and the mold is filled with the exterior resin such as, for example, the epoxy resin to seal the capacitor element. Thereafter, the frame including the capacitor element sealed with the exterior resin is taken out, and exposed portions of the anode terminal and the cathode terminal are bent along a surface of the exterior resin. Solid electrolytic capacitor 1 shown in FIG. 1 is thus completed.

In manufacturing the solid electrolytic capacitor including the capacitor element having the solid electrolyte layer, in particular, burr 55 produced when solid electrolyte layer 5 is formed using chemical polymerization or electrolytic polymerization is removed. As a result, portion 5b of solid electrolyte layer 5 may become relatively thinner after removal of burr 55. In addition, due to the shape of anode body 3, solid electrolyte layer 5 may also become relatively thinner at portion 5a corresponding to the corner of anode body 3, in particular.

In the above-mentioned method for manufacturing the solid electrolytic capacitor, insulating layer 6 is formed to cover such relatively thin portions 5a and 5b of solid electrolyte layer 5. As a result, an electrical short circuit between anode body 3 and silver paste layer 8 and carbon layer 7 serving as the cathode layer can be inhibited. As a result, the reliability of the solid electrolytic capacitor can be increased.

Figure 7:
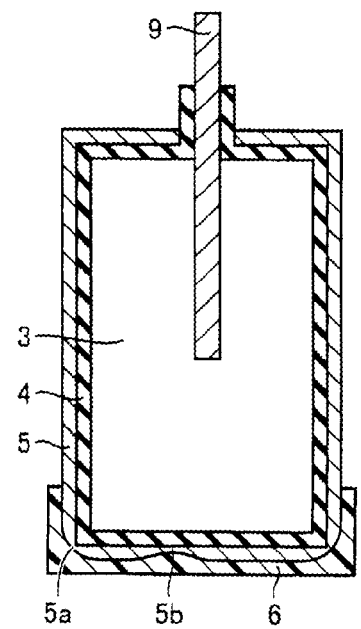
FIG. 7 is a cross-sectional view showing a step performed after the step shown in FIG. 6 in the second embodiment.

It is to be noted that in the above-mentioned method for manufacturing the solid electrolytic capacitor, a description has been given by way of example to the case where the epoxy resin and the like is coated using the dip method, the spray method and the like as a method for covering relatively thin portions 5a and 5b of solid electrolyte layer 5 with the insulating layer. In addition to this, as a method for forming the insulating layer, insulating layer 6 covering relatively thin portions 5a and 5b of solid electrolyte layer 5 may be formed by molding as shown in FIG. 7 by putting the anode body having the solid electrolyte layer formed thereon into the predetermined mold and filling the mold with the epoxy resin and the like. In addition, chemical polymerization and electrolytic polymerization may be used in combination as a method for forming the solid electrolyte layer.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method for manufacturing a solid electrolytic capacitor, comprising the steps of:
    forming an anode body having a predetermined shape;
    forming a dielectric coating to cover said anode body;
    forming a solid electrolyte layer to cover said dielectric coating;
    forming an insulating layer on said solid electrolyte layer; and
    forming a cathode layer on said solid electrolyte layer and said insulating layer, wherein
    in said step of forming said insulating layer, said insulating layer is formed at a portion corresponding to a corner of said anode body.

2. The method for manufacturing a solid electrolytic capacitor according to claim 1, wherein
    said step of forming an insulating layer includes a step of forming said insulating layer using a dip method or spray method.

3. A method for manufacturing a solid electrolytic capacitor, comprising the steps of:
    forming an anode body having a predetermined shape;
    forming a dielectric coating to cover said anode body;
    forming a solid electrolyte layer to cover said dielectric coating using at least one of chemical polymerization and electrolytic polymerization;
    removing a burr produced at said solid electrolyte layer;
    forming an insulating layer on said solid electrolyte layer; and
    forming a cathode layer on said solid electrolyte layer and said insulating layer, wherein
    in said step of forming said insulating layer, said insulating layer is formed at a portion in which said burr was removed.

4. The method for manufacturing a solid electrolytic capacitor according to claim 3, wherein
    said step of forming an insulating layer includes a step of forming said insulating layer using a dip method or spray method.

\* \* \* \* \*